(12) United States Patent
Cano et al.

(10) Patent No.: US 10,654,416 B2
(45) Date of Patent: May 19, 2020

(54) CARRIER PLATE AND OUTSIDE REAR VIEW MIRROR HAVING SUCH A CARRIER PLATE

(71) Applicant: Magna Mirrors Holding GmbH, Sailauf (DE)

(72) Inventors: David Cano, La Gariiga (ES); Jean-Dominique Cretin, Sant Cugat (ES)

(73) Assignee: Magna Mirrors Holding GmbH, Sailauf (DE)

( * ) Notice: Subject to any disclaimer, the term of this patent is extended or adjusted under 35 U.S.C. 154(b) by 384 days.

(21) Appl. No.: 15/708,606

(22) Filed: Sep. 19, 2017

(65) Prior Publication Data

US 2018/0079364 A1    Mar. 22, 2018

(30) Foreign Application Priority Data

Sep. 20, 2016   (DE) .......................... 10 2016 217 976

(51) Int. Cl.
*B60R 1/07*   (2006.01)
*B60R 1/072*  (2006.01)

(52) U.S. Cl.
CPC ................ *B60R 1/07* (2013.01); *B60R 1/072* (2013.01)

(58) Field of Classification Search
CPC ............ B60R 1/066; B60R 1/07; B60R 1/072
USPC .................................................. 359/872, 877
See application file for complete search history.

(56) References Cited

U.S. PATENT DOCUMENTS

| 4,488,778 A | * | 12/1984 | Polzer | B60R 1/06 248/466 |
| 4,877,214 A | * | 10/1989 | Toshiaki | B60R 1/072 248/483 |
| 5,355,255 A | * | 10/1994 | Assinder | B60R 1/06 248/481 |
| 5,604,645 A | * | 2/1997 | Weaver | B60R 1/072 248/27.3 |
| 5,615,054 A | * | 3/1997 | Lang | B60R 1/0605 359/841 |
| 5,721,646 A | * | 2/1998 | Catlin | B60R 1/0605 248/476 |

(Continued)

FOREIGN PATENT DOCUMENTS

| CN | 103347737 A | 10/2013 |
| CN | 203995963 U | 12/2014 |

(Continued)

OTHER PUBLICATIONS

German Search Report dated May 8, 2017 from corresponding German Patent Application No. 102016217976.4.

*Primary Examiner* — Ricky D Shafer
(74) *Attorney, Agent, or Firm* — Honigman LLP

(57) ABSTRACT

A carrier plate for a vehicle mirror includes a reflective element on its front side and a device for fastening a mirror glass adjuster on its rear side. The carrier plate includes cruciform slots originating from the center point of the mirror glass adjuster, and a circular arc-shaped opening, which extends along an outer radius R and has a depth directed towards the center point, being set along an annular wall in each of the quadrants formed by the slots. The circular arc-shaped opening has radial apertures, which extend further along the radius R towards the center point than the circular arc-shaped opening.

20 Claims, 2 Drawing Sheets

(56) References Cited

U.S. PATENT DOCUMENTS

| | | | | |
|---|---|---|---|---|
| 6,168,279 B1* | 1/2001 | Schnell | ................... | B60R 1/072 248/481 |
| 6,325,519 B1* | 12/2001 | Lang | ..................... | B60R 1/0605 248/477 |
| 7,142,345 B2* | 11/2006 | Bonardi | ............... | B60Q 1/2665 359/265 |
| 7,690,800 B2* | 4/2010 | Fukai | ...................... | B60R 1/072 359/873 |
| 9,434,313 B2* | 9/2016 | Minikey, Jr. | ......... | B60Q 1/2665 |
| 9,840,200 B2* | 12/2017 | de Swardt | ................. | B60R 1/06 |
| 2005/0213229 A1 | 9/2005 | Cofer et al. | | |
| 2006/0072202 A1 | 4/2006 | Bonardi et al. | | |

FOREIGN PATENT DOCUMENTS

| | | |
|---|---|---|
| DE | 102005050603 A1 | 9/2007 |
| DE | 102011101534 A1 | 11/2012 |
| EP | 1808334 A1 | 7/2007 |

\* cited by examiner

CARRIER PLATE AND OUTSIDE REAR VIEW MIRROR HAVING SUCH A CARRIER PLATE

CROSS REFERENCE TO RELATED APPLICATION

The present application claims priority of German patent application DE 102016217976.4, filed Sep. 20, 2016, which is hereby incorporated herein by reference in its entirety.

FIELD OF THE INVENTION

The invention relates to a carrier plate for a vehicle outside rear view mirror.

BACKGROUND OF THE INVENTION

Outside rear view mirrors of motor vehicles, which comprise a carrier plate and an external housing which are coupled to one another are widely known, the carrier plate being provided with fasteners which are intended to allow coupling of a position adjusting mechanism, such an adjusting mechanism allowing operation from inside of the vehicle, in order to position the carrier plate and consequently the mirror itself according to the sighting requirements of the driver of the vehicle.

The carrier plate of an outside rear view mirror is generally formed by an integral shell, which is obtained by plastic injection molding, mounting devices, which are intended for mounting an adjusting mechanism, being formed in the integral shell. The adjusting mechanism here is either a mechanical adjuster or an electrical glass adjustment drive, which has a virtually circular surface.

On its rear side the carrier plate is connected to the glass adjuster and carries the mirror glass on its front side.

A fastening is disclosed by DE 102005050603 A1. The fasteners disclosed comprise fastening seats, which are arranged peripherally in the carrier plate and are each provided with two side walls, opposing elastic pins being integrally defined with the basic shell. This affords the glass adjuster a flexible attachment to the carrier plate, but the plate itself is inflexible.

Outside rear view mirrors are used in numerous embodiments for the mirror glass. In addition to purely plane mirror glasses, aspherical glasses, partially spherical glasses and convex glasses are used. Here the plastic carrier plates are matched to the curvatures, so that all types of mirror glasses can be connected over their entire area to the carrier plate. This is important in view of the type approval regulations, which require that in the event of impact against an obstacle no glass splinters greater than a specific size may become detached from the carrier plate.

In terms of production, however, this makes it necessary to manufacture and stock glass carrier plates in different variants.

SUMMARY OF THE INVENTION

The present invention provides an improved, flexible carrier plate which can be adapted for all types of glass.

This is achieved by a carrier plate for a vehicle mirror, which comprises a reflective element on its front side and a device for fastening a mirror glass adjuster on its rear side, the carrier plate having cruciform slots originating from the center point of the mirror glass adjuster, and a circular arc-shaped opening being set along an annular wall in each of the quadrants formed by the slots and extending with radial apertures towards the center point.

The solution according to the invention makes the carrier plate flexible enough to allow adaptation to different mirror glasses. The slots and the apertures allow the individual quadrants of the mounting structure to move in a direction perpendicular to the surface of the carrier plate. The carrier plate can thereby be adhesively bonded to the mirror glass over its entire area. The radial apertures are important for the flexibility of the carrier plate, making it advantageous for the radial apertures to extend on both sides of the circular arc-shaped openings.

In order to maintain the stability of the carrier plate, it is advisable for tongues to extend from the edge radially into the circular arc-shaped openings.

It is advantageous to its function as a carrier plate for a glass adjuster, for hooks, as part of the annular wall, to extend perpendicularly away from the carrier plate, adjacent to the tongues.

Since the carrier plate is manufactured from a plastic injection molding, it is advantageous for the hooks to be stabilized by stabilizing keys between the surface of the carrier plate and the longitudinal extent of the hooks.

Stabilizing elements furthermore extend from the two outer points of the tongues and away from the annular wall, all the stabilizing elements being readily manufactured by plastic injection molding.

BRIEF DESCRIPTION OF THE DRAWINGS

The invention is described below by way of example, referring to the drawing attached.

DETAILED DESCRIPTION OF THE DRAWINGS

Figure 1:
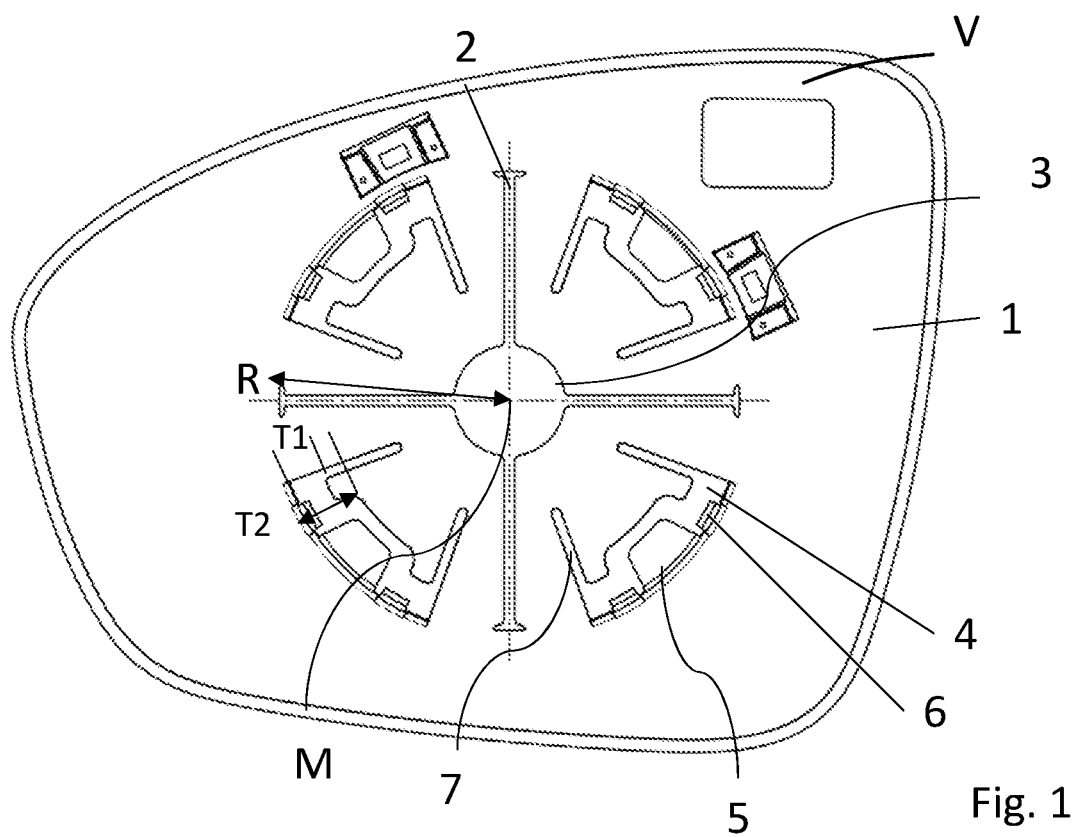
FIG. 1 shows a schematic representation of the carrier plate from the front side.

FIG. 1 shows a front view of a glass carrier plate. It can be seen that the glass carrier plate follows the shape of the mirror glass. The front side of the carrier plate already shows structures which are important for the flexibility of the carrier plate.

Slots 2 extend from a center point M in a cruciform pattern, the slots in this example being perpendicular to one another.

Circular arc-shaped openings 4 are situated in the quadrants formed by the slots 2. These openings 4 each extend along an outer radius R and have a depth directed towards the center point of ¼ to ⅓ R. Situated at the center of the carrier plate is a central opening 3. The opening radius RO of the central opening here is ⅛ to ¼ of the radius R up to the annular wall. The circular arc-shaped openings 4 here show a curved shape, the depth increasing from a value T1 to a value T2 and then diminishing to the value T1 again. Radial apertures 7 are arranged at each of the ends of the circular arc-shaped openings 4. These radial apertures 7 extend along the radius R and in so doing reach lengths of ½ to ⅔ R from the wall 8. As can already been seen from the front view, tongues 5 project into the openings 4.

Also discernible in the front view are hooks 6, which are arranged inside the area of the opening 4.

Figure 2:
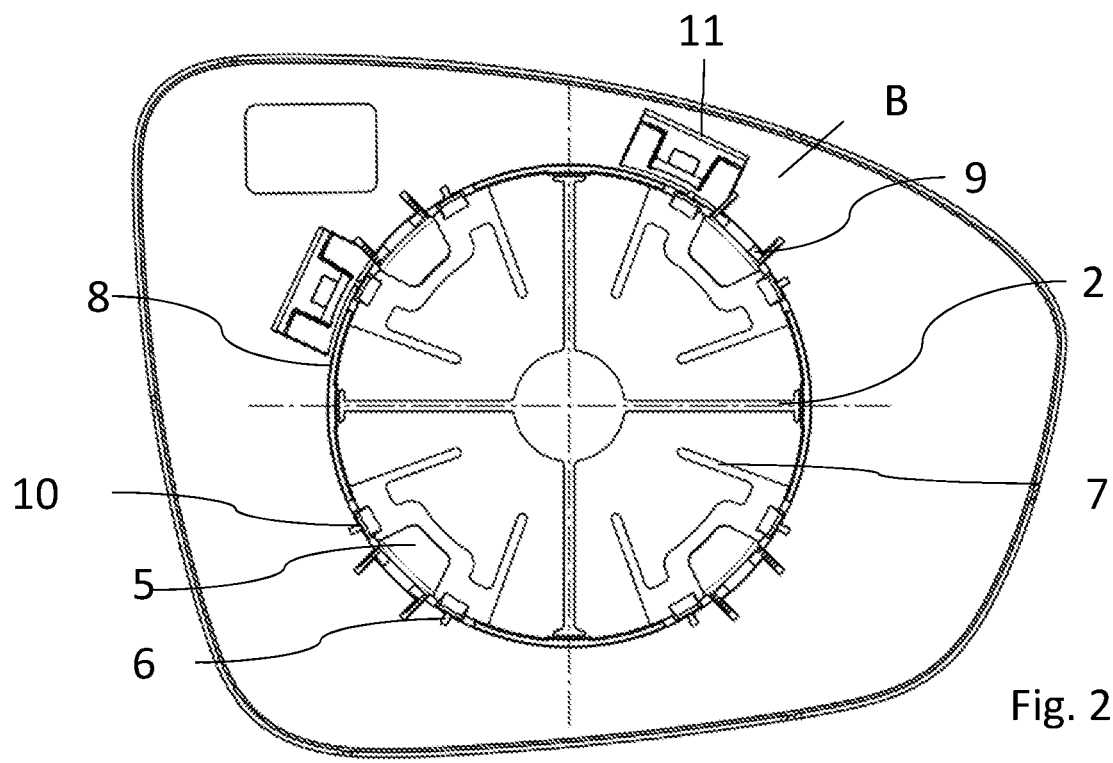
FIG. 2 shows a schematic representation of the carrier plate from the rear side.
Figure 4:
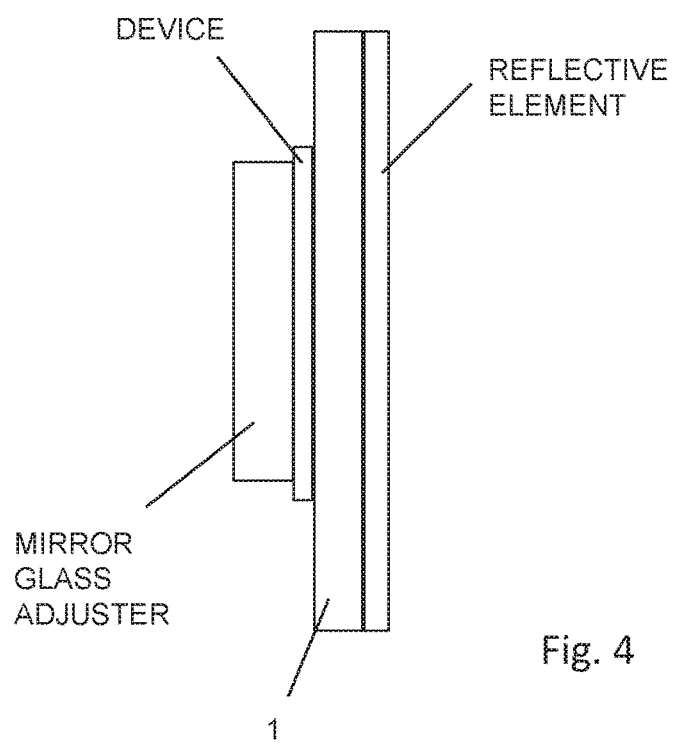
FIG. 4 is a side view schematic of the carrier plate, shown with the reflective element and mirror glass adjuster attached thereat.

In FIG. 2 the carrier plate 1 is represented in a view looking at the rear side B. It can be seen from this that the radius R defines an annular wall 8. A mirror glass adjuster 5 (FIG. 4) is fastened inside this annular wall. The recesses and apertures, together with the slots, are visible also from the rear side. From the edge of the annular wall 8 the tongues 5 extend towards the center point of the entire fastening arrangement. Stabilizing elements 9 can be seen at the two defining ends of the tongues 5. Hooks with stabilizing keys are attached adjacent to the stabilizing elements and the tongue 5.

Figure 3:
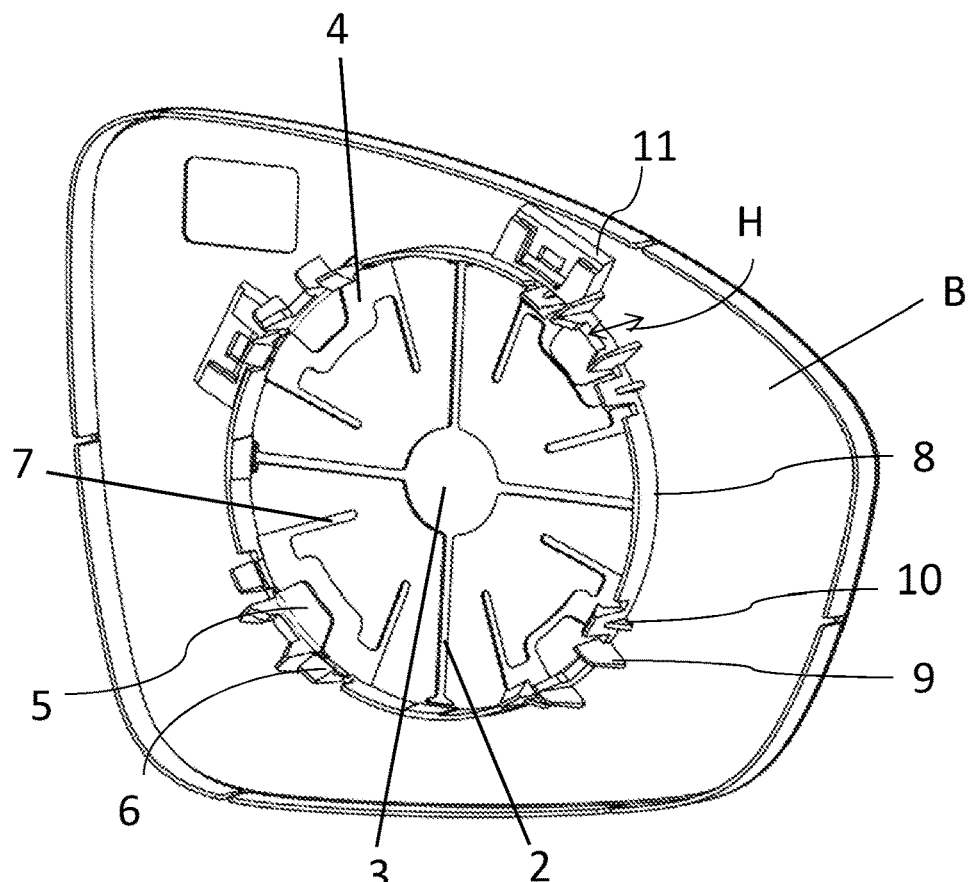
FIG. 3 shows a schematic representation of the carrier plate.

Looking at FIG. 3 it can clearly be seen that the stabilizing elements are situated at the outer defining points of the tongue and extend radially from the center of the fastening arrangement in the direction of the carrier plate. Furthermore, these stabilizing elements have a dimension, a height H, which extends perpendicularly away from the surface of the carrier plate. The hooks 6, lying adjacent to the stabilizing elements 9, have small stabilizing keys 10, which are situated between their vertical extent H and the surface of the carrier plate. The tongues 5 and the stabilizing elements 9 serve to keep the annular wall 8 stable when a glass adjuster is connected to the carrier plate via the hooks 6.

The radial gaps, created by the cruciform slots 2 and by the radial apertures 7, make the carrier plate less rigid. The individual quadrants between the slots 2 are able to move somewhat at the end running towards the center.

A reflective element (FIG. 4), a mirror glass, may therefore have a convex shape deviating from a purely plane surface and the carrier plate can nevertheless be adhesively bonded to the mirror glass over its entire area.

Also visible in FIG. 1 are sockets 11, which serve for mounting vibration-reducing friction springs.

The flexible carrier plates mean that only one variant needs to be produced for different mirror glasses, which reduces the costs.

LIST OF REFERENCE NUMERALS 1 carrier plate
2 cruciform slot
3 central opening
4 circular arc-shaped opening
5 tongue
6 hook
7 radial aperture
8 annular wall
9 stabilizing elements
10 stabilizing key
11 socket for friction spring
M middle
V front side
B rear side

The invention claimed is:

1. A carrier plate for a vehicle mirror, the carrier plate comprising:
   a reflective element on its front side and a device for fastening a mirror glass adjuster on its rear side;
   wherein the carrier plate comprises cruciform slots originating from a center point of the mirror glass adjuster, and a circular arc-shaped opening, which extends along an outer radius R and has a depth directed towards the center point, being set along an annular wall in each quadrant formed by the slots; and
   wherein the circular arc-shaped opening has radial apertures, which extend further along the outer radius R towards the center point than the circular arc-shaped opening.

2. The carrier plate according to claim 1, wherein the radial apertures extend on both sides of the circular arc-shaped openings.

3. The carrier plate according to claim 1, wherein tongues extend inboard of the annular wall radially into the circular arc-shaped openings.

4. The carrier plate according to claim 3, wherein hooks, as part of the annular wall, extend perpendicularly away from the carrier plate adjacent to the tongues.

5. The carrier plate according to claim 4, wherein the hooks are stabilized by stabilizing keys between the surface of the carrier plate and a longitudinal extent of the hooks.

6. The carrier plate according to claim 4, wherein the hooks are configured to attach the carrier plate to the mirror glass adjuster.

7. The carrier plate according to claim 3, wherein stabilizing elements extend from two outer points of the tongues and away from the annular wall.

8. The carrier plate according to claim 1, wherein at least two sockets for friction springs are situated on the annular wall.

9. A carrier plate for a reflective element of a vehicle mirror, the carrier plate comprising:
   a planar plate portion having a first side and a second side opposite the first side;
   wherein the first side of the plate portion is configured to attach at a reflective element;
   wherein the carrier plate comprises an annular structure protruding from the second side of the plate portion and configured for attaching the carrier plate to an electrically powered mirror glass adjuster;
   wherein a pair of slots are established through the plate portion, and wherein the slots intersect at a center aperture of the plate portion and extend radially outward from the center aperture toward the annular structure, and wherein the slots establish quadrants of the plate portion inboard of the annular structure;
   wherein a plurality of arcuate apertures are established inboard of and along the annular structure and between the center aperture and the annular structure, and wherein each of the arcuate apertures is disposed at a respective quadrant of the plate portion; and
   wherein a pair of radial slots extend from each of the arcuate apertures toward the center aperture.

10. The carrier plate according to claim 9, wherein the radial slots extend radially toward the center aperture from opposite ends of the arcuate apertures.

11. The carrier plate according to claim 9, comprising a tongue at each of the arcuate apertures, wherein each tongue extends inboard from the annular structure and radially into a respective one of the arcuate apertures.

12. The carrier plate according to claim 11, wherein the annular structure comprises hooks that extend from the plate portion adjacent to the tongues, wherein the hooks are configured to attach the carrier plate to the electrically powered mirror glass adjuster.

13. The carrier plate according to claim 12, wherein the hooks are stabilized by stabilizing keys established at an outboard side of the hooks.

14. The carrier plate according to claim 11, wherein the annular structure comprises a stabilizing element that extends from the planar portion at each end of each tongue.

15. The carrier plate according to claim 9, comprising at least two sockets for friction springs, wherein the at least two sockets are disposed outboard of the annular structure.

16. The carrier plate according to claim 9, wherein the annular structure comprises an annular wall that circumscribes the quadrants of the plate portion established by the slots.

17. A carrier plate for a reflective element of a vehicle mirror, the carrier plate comprising:

- a planar plate portion having a first side and a second side opposite the first side;
- wherein the first side of the plate portion is configured to attach at a reflective element;
- wherein the carrier plate comprises an annular structure configured for attaching the carrier plate to an electrically powered mirror glass adjuster, wherein the annular structure comprises an annular wall that circumscribes an attaching region of the carrier plate;
- wherein a pair of slots are established through the attaching region, and wherein the slots intersect at a center aperture of the attaching region and extend radially outward from the center aperture toward the annular structure, and wherein the slots establish quadrants of the attaching region inboard of the annular structure;
- wherein a plurality of arcuate apertures are established inboard of and along the annular structure and between the center aperture and the annular structure, and wherein each of the arcuate apertures is disposed at a respective quadrant of the attaching region;
- wherein a pair of radial slots extend from each of the arcuate apertures toward the center aperture, and wherein the radial slots extend radially toward the center aperture from opposite ends of the arcuate apertures; and
- wherein the attaching region comprises a tongue at each of the arcuate apertures, wherein each tongue extends inboard from the annular structure and radially into a respective one of the arcuate apertures.

18. The carrier plate according to claim 17, wherein the annular structure comprises hooks that extend from the plate portion adjacent to the tongues, wherein the hooks are configured to attach the carrier plate to the electrically powered mirror glass adjuster.

19. The carrier plate according to claim 18, wherein the hooks are stabilized by stabilizing keys established at an outboard side of the hooks.

20. The carrier plate according to claim 17, wherein the annular structure comprises a stabilizing element that extends from the planar portion at each end of each tongue.

* * * * *